(12) United States Patent
Yamamoto et al.

(10) Patent No.: US 9,776,908 B2
(45) Date of Patent: Oct. 3, 2017

(54) COATING FILM-ATTACHED GLASS, COATING FILM-ATTACHED CHEMICALLY STRENGTHENED GLASS, EXTERIOR MEMBER, AND ELECTRONIC DEVICE

(71) Applicant: ASAHI GLASS COMPANY, LIMITED, Tokyo (JP)

(72) Inventors: Hiroyuki Yamamoto, Haibara-gun (JP); Kazuhide Kuno, Haibara-gun (JP); Makoto Shiratori, Haibara-gun (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 194 days.

(21) Appl. No.: 14/885,017

(22) Filed: Oct. 16, 2015

(65) Prior Publication Data

US 2016/0031747 A1 Feb. 4, 2016

Related U.S. Application Data

(63) Continuation of application No. PCT/JP2014/061518, filed on Apr. 24, 2014.

(30) Foreign Application Priority Data

Apr. 25, 2013 (JP) ................ 2013-091935

(51) Int. Cl.
C03C 17/32 (2006.01)
C03C 4/02 (2006.01)
C03C 3/085 (2006.01)
C03C 3/087 (2006.01)
C03C 3/091 (2006.01)
C03C 3/095 (2006.01)
C03C 21/00 (2006.01)

(52) U.S. Cl.
CPC .............. C03C 4/02 (2013.01); C03C 3/085 (2013.01); C03C 3/087 (2013.01); C03C 3/091 (2013.01); C03C 3/095 (2013.01); C03C 17/32 (2013.01); C03C 21/002 (2013.01)

(58) Field of Classification Search
None
See application file for complete search history.

(56) References Cited

U.S. PATENT DOCUMENTS

2009/0068404 A1* 3/2009 Akieda ................ B32B 27/36
                                                  428/141
2013/0128434 A1   5/2013 Yamamoto et al.
2014/0017499 A1*  1/2014 Yamamoto ............... C03C 3/11
                                                  428/410
2014/0099501 A1   4/2014 Yamamoto et al.
2014/0113141 A1   4/2014 Yamamoto et al.
2014/0335335 A1* 11/2014 Koch, III ............... G02B 1/105
                                                  428/213
2015/0166400 A1*  6/2015 Yamamoto ............. C03C 3/085
                                                  428/410
2015/0166403 A1*  6/2015 Yamamoto ............. C03C 3/083
                                                  428/410
2015/0175473 A1*  6/2015 Yamamoto ............. C03C 3/085
                                                  428/410
2016/0039709 A1*  2/2016 Yamamoto ........... C03C 21/002
                                                  428/410

FOREIGN PATENT DOCUMENTS

| CN | 102960081 | 3/2013 |
| JP | 2009-061730 | 3/2009 |
| JP | 5110236 | 12/2012 |
| JP | 2013-056823 | 3/2013 |
| TW | 201242923 | 11/2012 |
| TW | 201245080 | 11/2012 |
| TW | 201245081 | 11/2012 |
| WO | WO 2012/124757 | 9/2012 |
| WO | WO 2012/124758 | 9/2012 |

OTHER PUBLICATIONS

English translation of the International Preliminary Report on Patentability and Written Opinion issued on Nov. 5, 2015 in PCT/JP2014/061518 filed Apr. 24, 2014.
International Search Report issued Aug. 5, 2014 in PCT/JP2014/061518 filed Apr. 24, 2014.

* cited by examiner

*Primary Examiner* — David Sample
(74) *Attorney, Agent, or Firm* — Oblon, McClelland, Maier & Neustadt, L.L.P.

(57) ABSTRACT

Coating film-attached glass includes: glass containing a coloring component; and a colored coating film formed on one major surface of the glass, wherein at least one of an absolute value of a difference between ($\Delta a^*(D65-F2)$) of the glass and ($\Delta a^*(D65-F2)$) of the coating film and an absolute value of a difference between ($\Delta a^*(A-F2)$) of the glass and ($\Delta a^*(A-F2)$) of the coating film is 0.2 or more, where ($\Delta a^*(D65-F2)$) is a difference between a chromaticity a* value of reflected light by a D65 light source and a chromaticity a* value of reflected light by an F2 light source in an L*a*b* color system and ($\Delta a^*(A-F2)$) is a difference between a chromaticity a* value of reflected light by an A light source and the chromaticity a* value of the reflected light by the F2 light source in the L*a*b* color system.

13 Claims, No Drawings

COATING FILM-ATTACHED GLASS, COATING FILM-ATTACHED CHEMICALLY STRENGTHENED GLASS, EXTERIOR MEMBER, AND ELECTRONIC DEVICE

CROSS-REFERENCE TO RELATED APPLICATIONS

This application is a continuation of prior International Application No. PCT/JP2014/061518, filed on Apr. 24, 2014 which is based upon and claims the benefit of priority from Japanese Patent Application No. 2013-091935 filed on Apr. 25, 2013; the entire contents of all of which are incorporated herein by reference.

FIELD

The present invention relates to coating film-attached glass and coating film-attached chemically strengthened glass which are used as exterior members of electronic devices, for example, exterior members, decorative articles, and the like of portably usable communication devices or information devices, and to an exterior member and an electronic device which use these coating film-attached glasses. In the present description, "chemically strengthened glass" refers to glass on whose surface a compressive stress layer is formed by chemical strengthening, that is, glass having been chemically strengthened.

BACKGROUND

As exterior members and decorative articles of electronic devices such as portable telephones, appropriate materials are selected from materials such as resin and metal and are used, in consideration of various factors such as decorativeness, scratch resistance, workability, and cost.

Attempts have recently been made to use glass which has not conventionally been used, as a material of an exterior member (JP-A 2009-61730 (KOKAI)). Patent Document 1 says that it is possible to exhibit a clear and unique decorative effect by forming the exterior member itself of glass in an electronic device such as a portable telephone.

SUMMARY

Exterior members and decorative articles of electronic devices are required to have various design expressions reflecting a variety of consumers' tastes. A color tone is one of especially important design expressions. Glass used as the exterior members of the electronic devices is required to faithfully reproduce a color tone that is based on data obtained through marketing activities and a color tone decided by a designer.

Further, electronic devices are provided with display devices such as liquid crystal panels on outer surfaces of the devices. Definition and luminance of these display devices are on the increasing trend, and accordingly luminance of backlights serving as light sources is also on the increasing trend. Light from the light source is sometimes multi-reflected inside the device to reach a rear surface of an exterior housing, besides being radiated to a display device side. The use of metal as a material of the housing does not have a problem of transmission of the light, but when glass having a light transmitting property is used, the light from the light source is transmitted by the housing and is liable to be recognized from the outside of the device. Therefore, when glass is used as the material of the housing, a light blocking means such as a coating film for imparting a light blocking property to the glass is formed on a rear surface of the glass.

For example, glass whose lightness L* value (the L*a*b* color system standardized by the Internationale de l'Eclairage (CIE)) is 20 or more transmits part of lights with visible spectrum wavelengths. Therefore, a reflected color tone of the coating film formed on the rear surface of the glass is also involved in setting the color tone.

However, the color tone of the coating film formed on the rear surface of the glass is adjusted mainly for the purpose of the light blocking property, and in the color tone of the coating film by itself, the reflected color tone often differs depending on whether it is indoors or outdoors. Therefore, an exterior member made of glass on which such a coating film is formed has a problem that its recognized color tone differs depending on whether it is indoors or outdoors.

It is an object of the present invention to provide coating film-attached glass and chemically strengthened glass which are capable of correcting a change characteristic of a reflected color tone of a coating film, and an exterior member and an electronic device including the coating film-attached glass or chemically strengthened glass.

As a result of various studies, the present inventors have taken note of a change characteristic of a reflected color tone (hereinafter, sometimes referred to as metamerism) of glass containing a coloring component. Then, it has been found out that, in coating film-attached glass on which a coating film is formed, by using glass having metamerism different from metamerism of the coating film, it is possible to obtain desired metamerism as the glass on which the coating film is formed.

Specifically, the coating film-attached glass of the present invention includes: glass containing a coloring component; and a colored coating film formed on one major surface of the glass, wherein at least one of an absolute value of a difference between ($\Delta a^*$(D65−F2)) of the glass and ($\Delta a^*$(D65−F2)) of the coating film and an absolute value of a difference between ($\Delta a^*$(A−F2)) of the glass and ($\Delta a^*$(A−F2)) of the coating film is 0.2 or more, where ($\Delta a^*$(D65−F2)) is a difference between a chromaticity a* value of reflected light by a D65 light source and a chromaticity a* value of reflected light by an F2 light source in an L*a*b* color system, which difference is expressed by the following expression (1), $\Delta a^*$(D65−F2)=a* value (D65 light source)−a* value (F2 light source) . . . (1), and ($\Delta a^*$(A−F2)) is a difference between a chromaticity a* value of reflected light by an A light source and the chromaticity a* value of the reflected light by the F2 light source in the L*a*b* color system, which difference is expressed by the following expression (2), $\Delta a^*$(A−F2)=a* value (A light source)−a* value (F2 light source) . . . (2), values calculated by the expression (1) and the expression (2) are values of chromaticities of the major surface which are measured on the glass in a state of a glass plate with a 0.8 mm thickness, and values of chromaticities which are measured on the coating film in a state of being formed on a transparent substrate.

Further, the coating film-attached chemically strengthened glass of the present invention is coating film-attached glass including: glass containing a coloring component; and a colored coating film formed on one major surface of the glass, wherein: at least one of an absolute value of a difference between ($\Delta a^*$(D65−F2)) of the glass and ($\Delta a^*$(D65−F2)) of the coating film and an absolute value of a difference between ($\Delta a^*$(A−F2)) of the glass and ($\Delta a^*$(A−F2)) of the coating film is 0.2 or more; where ($\Delta a^*$(D65−F2)) is a difference between a chromaticity a* value of reflected light by a D65 light source and a chromaticity a* value of reflected light by an F2 light source in an L*a*b* color system, which difference is expressed by the following expression (1), Δa*(D65−F2)=a* value (D65 light source)−a* value (F2 light source) . . . (1), and (Δa*(A−F2)) is a difference between a chromaticity a* value of reflected light by an A light source and the chromaticity a* value of the reflected light by the F2 light source in the L*a*b* color system, which difference is expressed by the following expression (2), Δa*(A−F2)=a* value (A light source)−a* value (F2 light source) . . . (2), values calculated by the expression (1) and the expression (2) are values of chromaticities of the major surface which are measured on the glass in a state of a glass plate with a 0.8 mm thickness, and values of chromaticities which are measured on the coating film in a state of being formed on a transparent substrate; and the glass is chemically strengthened glass having a surface compressive stress layer with a 5 to 70 μm from a surface of the glass in a depth direction.

The exterior member of the present invention includes the coating film-attached glass of the present invention or the coating film-attached chemically strengthened glass of the present invention.

Further, the electronic device of the present invention includes the exterior member of the present invention provided on an exterior of the electronic device.

According to the present invention, it is possible to obtain the coating film-attached glass and the coating film-attached chemically strengthened glass whose change characteristic of the reflected color tone is corrected to a desired characteristic, by combining the glass having a change characteristic of the reflected color tone different from a change characteristic of the reflected color tone of the coating film. Further, by using the coating film-attached glass or the coating film-attached chemically strengthened glass, it is possible to obtain the exterior member and the electronic device having a desired change characteristic of a reflected color tone.

DETAILED DESCRIPTION

Metamerism is an index indicating a degree of a color change of a color tone or an appearance color due to an outside light color and can be defined by using the L*a*b* color system standardized by the CIE (Internationale de l'Eclairage). As this metamerism is lower, the degree of the color change of the color tone or the appearance color due to the outside light color is smaller. In a case where metamerism of an exterior member is high, an apparent color tone of the exterior member becomes greatly different under different kinds of light sources. For example, the color tone of the exterior member when it is indoors and the color tone of the exterior member when it is outdoors become greatly different.

Further, when a surface made of different materials exists on an exterior member or the like, a change of a reflected color tone is more prominently recognized due to a difference in metamerism between the different materials.

Coating film-attached glass or coating film-attached chemically strengthened glass of an embodiment includes: glass containing a coloring component; and a colored coating film formed on one major surface of the glass, wherein at least one of an absolute value of a difference between (Δa*(D65−F2)) of the glass and (Δa*(D65−F2)) of the coating film and an absolute value of a difference between (Δa*(A−F2)) of the glass and (Δa*(A−F2)) of the coating film is 0.2 or more, where (Δa*(D65−F2)) is a difference between a chromaticity a* value of reflected light by a D65 light source and a chromaticity a* value of reflected light by an F2 light source in an L*a*b* color system, which difference is expressed by the following expression (1), Δa*(D65−F2)=a* value (D65 light source)−a* value (F2 light source) . . . (1), and (Δa*(A−F2)) is a difference between a chromaticity a* value of reflected light by an A light source and the chromaticity a* value of the reflected light by the F2 light source in the L*a*b* color system, which difference is expressed by the following expression (2), Δa*(A−F2)=a* value (A light source)−a* value (F2 light source) . . . (2).

Note that metamerism of the glass presents the same tendency before and after chemical strengthening.

Consequently, the coating film and the glass, used in the coating film-attached glass or the coating film-attached chemically strengthened glass of the embodiment, are different from in a change characteristic of a reflected color tone by a predetermined amount or more. Therefore, in the glass on whose one major surface the colored coating film is formed, metamerism ascribable to the coating film is corrected by the metamerism of the glass, so that the coating film-attached glass having desired metamerism can be obtained. In the aforesaid glass or chemically strengthened glass, at least one of the absolute value of the difference between (Δa*(D65−F2)) of the glass and (Δa*(D65−F2)) of the coating film and the absolute value of the difference between (Δa*(A−F2)) of the glass and (Δa*(A−F2)) of the coating film is preferably 0.2 or more, more preferably 0.5 or more, still more preferably 0.8 or more, and even more preferably 1.0 or more.

In the coating film-attached glass or the coating film-attached chemically strengthened glass, when the absolute value of the difference between (Δa*(D65−F2)) of the glass and (Δa*(D65−F2)) of the coating film and the absolute value of the difference between (Δa*(A−F2)) of the glass and (Δa*(A−F2)) of the coating film are both less than 0.2, it may not be possible to sufficiently obtain the effect of correcting the reflected color tone of the coating film.

Δa*(D65−F2) refers to the difference between the chromaticity a* value of the reflected light by the D65 light source and the chromaticity a* value of the reflected light by the F2 light source in the L*a*b* color system.

Δa*(A−F2) refers to the difference between the chromaticity a* value of the reflected light by the A light source and the chromaticity a* value of the reflected light by the F2 light source in the L*a*b* color system.

$$\Delta a^*(D65-F2)=a^*\text{value}(D65 \text{ light source})-a^*\text{value}(F2 \text{ light source}) \quad (1)$$

$$\Delta a^*(A-F2)=a^*\text{value}(A \text{ light source})-a^*\text{value}(F2 \text{ light source}) \quad (2)$$

As values of Δa*(D65−F2) defined by the above expression (1) and Δa*(A−F2) defined by the above expression (2) in terms of absolute values are smaller, the change of the characteristic of the reflected color tone ascribable to a difference of a light source can be made smaller. Therefore, as Δa*(D65−F2) and Δa*(A−F2) of the glass or the chemically strengthened glass being a constituent element of the embodiment differ more from Δa*(D65−F2) and Δa*(A−F2) of the coating film, the effect of correcting the metamerism as the coating film-attached glass is larger.

The metamerism of the coating film-attached glass or the coating film-attached chemically strengthened glass of the embodiment is corrected in the following two directions.

Firstly, by using the coating film-attached glass or the coating film-attached chemically strengthened glass of the embodiment as an exterior member, Δa*(D65−F2) and Δa*(A−F2) of the coating film-attached glass are made similar to Δa*(D65−F2) and Δa*(A−F2) of a material (for example, metal, resin, ceramics, glass coated with a coating film of a different kind from the aforesaid coating film, or the like) different from the coating film-attached glass used as the exterior member. Consequently, even if the coating film-attached glass and the material different from this coating film-attached glass are used in combination as constituent members of the same exterior member, there is no unnatural feeling in the change of the reflected color tone ascribable to the difference of the light source because the degrees of the metamerism are similar as described above.

Secondly, by using the coating film-attached glass or the coating film-attached chemically strengthened glass of the embodiment as an exterior member, its Δa* (D65−F2) and Δa*(A−F2) are made to approximate zero as much as possible (that is, a difference between a reflected color tone indoors and a reflected color tone outdoors is made small). As the change characteristics of the reflected color tones of the glass or the chemically strengthened glass and the coating film formed on the glass surface are larger, the effect of correcting the change characteristic of the reflected color tone of the coating film is larger. Therefore, by selecting the combination in consideration of Δa*(D65−F2) and Δa*(A−F2) of the coating film so that Δa*(D65−F2) and Δa*(A−F2) of the glass or the chemically strengthened glass satisfy a predetermined relation, it is possible to make the change characteristic of the reflected color tone of the glass or chemically strengthened glass coated with the coating film approximate zero as much as possible.

Further, the glass or the chemically strengthened glass and the coating film preferably differ in at least one of directionality of Δa*(D65−F2) and directionality of Δa*(A−F2). The "directionality" in directionality of Δa*(D65−F2) and directionality of Δa*(A−F2) refers to whether values of these are on a plus side (0 or more) or on a minus side (less than 0) with respect to the origin 0. Further, "different in directionality" means that Δa*(D65−F2) of the glass and Δa*(D65−F2) of the coating film are different in the directionality, for example, when the former is on the plus side, the latter is on the minus side.

As describe above, the coating film-attached glass or the coating film-attached chemically strengthened glass of the embodiment is different from the coating film in both of or one of the directionality of Δa*(D65−F2) and the directionality of Δa*(A−F2), which makes it possible to increase the effect of correcting the metamerism of the coating film. Consequently, by forming the coating film on the glass or the chemically strengthened glass, it is possible to impart desired metamerism to the coating film-attached glass or the coating film-attached chemically strengthened glass of the embodiment.

The reflected color tone of the glass used in the coating film-attached glass or the coating film-attached chemically strengthened glass of the embodiment is measured and evaluated on the glass in a state of a glass plate with a 0.8 mm thickness. This is because a reflected color tone of a glass plate changes depending on its plate thickness and therefore the plate thickness is specified as 0.8 mm. Note that, at the time of measuring the reflected color tone of the glass plate, a white resin plate is placed on a rear surface (surface opposite a surface on which light from the light source is incident) of the glass plate.

In the L*a*b* color system, the a* value represents a color tone change from red to green and the b* value represents a color tone change from yellow to blue. Out of the color tone changes, it is the color tone change from red to green that a person perceives more sensitively. Therefore, in the coating film-attached glass or the coating film-attached chemically strengthened glass of the embodiment, a focus is put on the difference (Δa*(D65−F2)) between the chromaticity a* value of the reflected light by the D65 light source and the chromaticity a* value of the reflected light by the F2 light source in the L*a*b* color system and the difference (Δa*(A−F2)) between the chromaticity a* value of the reflected light by the A light source and the chromaticity a* value of the reflected light by the F2 light source in the L*a*b* color system.

In the glass or the chemically strengthened glass used in the embodiment, a lightness L* value (F2 light source) defined by using the L*a*b* color system is preferably within a 20 to 90 range. Specifically, when the L* value falls within the above range, it is within a range that facilitates recognizing the color tone change because lightness of a pigment is in an intermediate region of "bright" to "dark", and thus the use of the embodiment is more effective. Incidentally, when the L* value is less than 20, the glass or the chemically strengthened glass takes on a deep color and thus the color tone change of the glass or the chemically strengthened glass is difficult to recognize. Further, when the L* value is over 90, the glass or the chemically strengthened glass takes on a pale color and thus the color tone change of the glass or the chemically strengthened glass is difficult to recognize. The L* value is preferably 22 to 85, more preferably 23 to 80, and still more preferably 24 to 75. In the case where the chromaticity of the major surface is measured on the glass in the state of the glass plate with the 0.8 mm thickness by using the F2 light source, the above lightness L* value is based on data obtained when the measurement of the reflected light is conducted, with the white resin plate being placed on the rear surface of the glass plate.

In the glass or the chemically strengthened glass of the embodiment, the glass can contain, as the coloring component, $M_pO_q$ (M is at least one kind selected from Fe, Cu, V, Se, Co, Ti, Cr, Pr, Ce, Bi, Eu, Mn, Er, Ni, Nd, W, Rb, and Ag, and p and q are atomic ratios of M and O) whose content in terms of molar percentage on an oxide basis is 0.001 to 10%. These coloring components are components for coloring the glass to a desired color and adjusting the metamerism, and by appropriately selecting the coloring components, it is possible to obtain the glass having a color such as, for example, a blue-based color, a green-based color, a yellow-based color, a violet-based color, a pink-based color, a red-based color, or an achromatic color.

When the content of the above coloring component is less than 0.001%, the glass is colored very thinly, and accordingly the use of such glass makes it difficult to adjust the reflected color tone of the coating film-attached glass. Therefore, 0.01% or more thereof is contained. The content is preferably 0.005% or more, and more preferably 0.01% or more. Further, when the content is over 10%, the glass becomes unstable, which is liable to result in devitrification. Therefore, the content is set to 10% or less. It is preferably 8% or less, and more preferably 5% or less.

Further, by using at least one kind selected from, for example, $Co_3O_4$ and CuO as the aforesaid coloring component, it is possible to obtain blue-based colored glass. By using at least one kind selected from $V_2O_5$, $Cr_2O_3$, CuO, and $Pr_6O_{11}$, it is possible to obtain green-based colored glass. Further, by using at least one kind selected from $CeO_2$, $V_2O_5$, $Bi_2O_3$, and $Eu_2O_3$, it is possible to obtain yellow-based colored glass. By using at least one kind selected from $MnO_2$, $Er_2O_3$, NiO, $Nd_2O_3$ and $WO_3$, it is possible to obtain violet to pink-based colored glass. By using at least one kind selected from $Cu_2O$ and $Ag_2O$, it is possible to obtain red-based colored glass. By using at least one kind selected from $Fe_2O_3$, $V_2O_5$, $Cr_2O_3$, NiO, and Se, it is possible to obtain gray to black-based (achromatic) colored glass.

A reason why the metamerism occurs in glass or a coating film is thought to be as follows.

For example, a reflected color tone of glass results from the combination of spectral distribution of a light source and spectral reflectance of the glass. The spectral distribution of the light source differs depending on the kind of the light source. The D65 light source is a light source for measuring an object color illuminated with daylight including light in an ultraviolet region, and presents broad spectral distribution in a visible wavelength region. The F2 light source is white light of a typical fluorescent lamp and presents spectral distribution having a peak at a specific wavelength in the visible wavelength region. The A light source is light emitted by a tungsten bulb, corresponds to light of an ordinary household bulb, and presents spectral distribution monotonously increasing at about 400 nm to 800 nm wavelengths. On the other hand, the coloring component contained in the glass differs in a wavelength that it absorbs, depending on components thereof.

Therefore, in the spectral reflectance of the glass containing the coloring component, a wavelength absorption characteristic ascribable to the kind of the light source differs depending on the kind and content of the contained coloring component, and this is thought to be a reason why the metamerism occurs.

Next, a composition of the glass or the chemically strengthened glass (excluding the coloring component) being the constituent member of the embodiment will be described.

An example of the glass or the chemically strengthened glass used in the embodiment is a glass containing, in terms of molar percentage on a basis of the following oxides, 55 to 80% of $SiO_2$, 0.25 to 16% of $Al_2O_3$, 0 to 12% of $B_2O_3$, 5 to 20% of $Na_2O$, 0 to 15% of $K_2O$, 0 to 15% of MgO, 0 to 15% of CaO, 0 to 25% of $\Sigma RO$ (R is Mg, Ca, Sr, Ba, Zn), and 0.001 to 10% of MpOq (M is at least one kind selected from Fe, Cu, V, Se, Co, Ti, Cr, Pr, Ce, Bi, Eu, Mn, Er, Ni, Nd, W, Rb, and Ag, and p and q are atomic ratios of M and O).

Hereinafter, the composition of the glass or the chemically strengthened glass used in the embodiment will be described by using the content in terms of molar percentage on the oxide basis, unless otherwise specified.

Note that, in this description, the content of each of the components and the coloring components of the glass indicates an equivalent content when each of the components existing in the glass is assumed to exist as the given oxide.

For example, "contains 0.001 to 5% of $Fe_2O_3$" means that the Fe content when it is assumed that Fe existing in the glass all exists in the form of $Fe_2O_3$, that is, the $Fe_2O_3$ equivalent content of Fe is 0.001 to 5%.

$SiO_2$ is a component constituting a skeletal structure of the glass and is indispensable. When its content is less than 55%, stability as the glass lowers, or weather resistance lowers. Preferably, its content is 60% or more. 65% or more is more preferable. When the content of $SiO_2$ is over 80%, viscosity of the glass increases, which greatly lowers its melting property. Its content is preferably 75% or less, and typically 70% or less.

$Al_2O_3$ is a component that improves the weather resistance of the glass and is indispensable. When its content is less than 0.25%, the weather resistance lowers. Its content is preferably 0.5% or more, and typically 1% or more.

When the content of $Al_2O_3$ is over 16%, the viscosity of the glass becomes high, resulting in a difficulty in uniform melting. Its content is preferably 14% or less, and typically 12% or less.

$B_2O_3$ is a component that improves the weather resistance of the glass, and can be contained as required, though not indispensable. When the content of $B_2O_3$, if it is contained, is less than 4%, it may not be possible to obtain a significant effect of improving the weather resistance. Its content is preferably 5% or more, and typically 6% or more.

When the content of $B_2O_3$ is over 12%, a stria due to volatilization occurs, which is liable to lower yields. Its content is preferably 11% or less, and typically 10% or less.

$Na_2O$ is a component that improves the melting property of the glass and is indispensable. When its content is less than 5%, the melting property worsens. Its content is preferably 6% or more, and typically 7% or more.

When the content of $Na_2O$ is over 20%, the weather resistance lowers. Its content is preferably 18% or less, and typically 16% or less.

$K_2O$ is a component that improves the melting property of the glass and thus is a component preferably contained, though not indispensable. When the content of $K_2O$, if it is contained, is less than 0.01%, it may not be possible to obtain a significant effect of improving the melting property. Its content is typically 0.3% or more. When the content of $K_2O$ is over 15%, the weather resistance lowers. Its content is preferably 13% or less, and typically 10% or less.

RO (R represents Mg, Ca, Sr, Ba, Zn) is a component that improves the melting property of the glass, and though it is not indispensable, one kind or more of them can be contained as required. When the total content $\Sigma RO$ ($\Sigma RO$ represents MgO+CaO+SrO+BaO+ZnO) of RO in this case is less than 1%, the melting property is liable to lower. Its content is preferably 3% or more, and typically 5% or more. When $\Sigma RO$ is over 25%, the weather resistance lowers. Its content is preferably 20% or less, more preferably 18% or less, and typically 15% or less.

MgO is a component that improves the melting property of the glass, and can be contained as required, though not indispensable. When the content of MgO, if it is contained, is less than 3%, it may not be possible to obtain a significant effect of improving the melting property. Its content is typically 4% or more. When the content of MgO is over 15%, the weather resistance lowers. Its content is preferably 13% or less, and typically 12% or less.

CaO is a component that improves the melting property of the glass and can be contained as required, though not indispensable. When the content of CaO, if it is contained, is less than 0.01%, a significant effect of improving the melting property cannot be obtained. Its content is typically 0.1% or more. When the content of CaO is over 15%, a chemically strengthened property lowers. Its content is preferably 12% or less, and typically 10% or less.

SrO is a component for improving the melting property and can be contained as required, though not indispensable. When the content of SrO, if it is contained, is less than 1%, it may not be possible to obtain a significant effect of improving the melting property. Its content is preferably 3% or more, and typically 6% or more. When the content of SrO is over 15%, the weather resistance is liable to lower. Its content is preferably 12% or less, and typically 9% or less.

BaO is a component for improving the melting property and can be contained as required, though not indispensable. When the content of BaO, if it is contained, is less than 1%, it may not be possible to obtain a significant effect of improving the melting property. Its content is preferably 3% or more, and typically 6% or more. When the content of BaO is over 15%, the weather resistance is liable to lower. Its content is preferably 12% or less, and typically 9% or less.

ZnO is a component for improving the melting property and can be contained as required, though not indispensable. When the content of ZnO, if it is contained, is less than 1%, it may not be possible to obtain a significant effect of improving the melting property. Its content is preferably 3% or more, and typically 6% or more. When the content of ZnO is over 15%, the weather resistance is liable to lower. Its content is preferably 12% or less, and typically 9% or less.

The following components may be introduced into the glass composition, besides the aforesaid components.

$ZrO_2$ is a component for improving the melting property and can be contained within a range of 1% or less, though not indispensable. When the content of $ZrO_2$ is over 1%, the melting property worsens, which is liable to cause a case where it remains in the glass as an unmelted substance. Typically, $ZrO_2$ is not contained.

$SO_3$ is a component that acts as a clarifying agent and can be contained as required, though not indispensable. When the content of $SO_3$, if it is contained, is less than 0.005%, an expected clarifying operation cannot be obtained. Its content is preferably 0.01% or more, and more preferably 0.02% or more. 0.03% or more is the most preferable. Further, when its content is over 0.5%, it becomes a bubble generating source contrary to the intention, which is liable to lower a melting speed of the glass or increase the number of bubbles. Its content is preferably 0.3% or less, and more preferably 0.2% or less. 0.1% or less is the most preferable.

$SnO_2$ is a component that acts as a clarifying agent and can be contained as required, though not indispensable. When the content of $SnO_2$, if it is contained, is less than 0.005%, an expected clarifying operation cannot be obtained. Its content is preferably 0.01% or more, and more preferably 0.05% or more. Further, when its content is over 1%, it becomes a bubble generating source contrary to the intention, which is liable to lower the melting speed of the glass or increase the number of bubbles. Its content is preferably 0.8% or less, and more preferably 0.5% or less. 0.3% or less is the most preferable.

A chloride or a fluoride may be appropriately contained as the clarifying agent when the glass melts, besides the aforesaid $SO_3$ and $SnO_2$.

$Li_2O$ is a component for improving the melting property and can be contained as required, though not indispensable. When the content of $Li_2O$, if it is contained, is less than 1%, it may not be possible to obtain a significant effect of improving the melting property. Its content is preferably 3% or more, and typically 6% or more. When the content of $Li_2O$ is over 15%, the weather resistance is liable to lower. Its content is preferably 10% or less, and typically 5% or less.

The glass used in the embodiment may be chemically strengthened glass having a surface compressive stress layer on the surface of the glass. Consequently, it is possible to obtain glass having high mechanical strength. The strengthening is preferably applied so that a depth (hereinafter, sometimes referred to as DOL) of the surface compressive stress layer formed on the surface of the glass becomes 5 μm to 70 μm. When the glass is used as an exterior member, there is a high probability that the surface of the glass suffers a contact scratch, which sometimes lowers the mechanical strength of the glass. Therefore, if DOL is less than 5 μm, the mechanical strength of the glass is liable to lower when the contact scratch is formed deeper than DOL. Further, when DOL is over 70 μm, cutting of the glass after the strengthening becomes difficult. DOL is preferably 5 μm to 40 μm, and more preferably 10 μm to 30 μm.

Preferably, the chemically strengthened glass of the embodiment has been chemically strengthened so that a surface compressive stress (hereinafter, sometimes referred to as CS) formed on the glass surface becomes, for example, 300 MPa or more, 500 MPa or more, 700 MPa or more, or 900 MPa or more. An increase of a numeric value of CS results in an increase of the mechanical strength of the chemically strengthened glass. On the other hand, too high CS is liable to extremely increase a tension stress inside the glass, and therefore CS is preferably 1400 MP or less, and more preferably 1300 MPa or less.

As a method to increase the strength of the glass, a method of forming the compressive stress layer on the glass surface has been generally known. As a method to form the compressive stress layer on the glass surface, an air-cooling tempering method (physical tempering method) and a chemical strengthening method are typical. The air-cooling tempering method (physical tempering method) is a method in which a glass plate surface heated up to the vicinity of a softening point is rapidly cooled by air-cooling or the like. Further, the chemical strengthening method is a method in which alkali metal ions (typically Li ions, Na ions) with a small ion radius existing on the glass plate surface are exchanged with alkali ions (typically Na ions or K ions for the Li ions, and K ions for the Na ions) with a larger ion radius by ion exchange at a temperature equal to or lower than a glass transition point.

For example, glass used as an exterior member of an electronic device is often used with a 2 mm thickness or less in general. Applying the air-cooling tempering method to such a thin glass plate makes it difficult to form the compressive stress layer because it is difficult to ensure a temperature difference between the surface and the interior. Consequently, it is not possible to obtain an intended high strength property in the glass having undergone the strengthening. Further, the air-cooling tempering involves a great concern that planarity of the glass plate is lost due to variation in cooling temperature. Regarding a thin glass plate, the concern that the planarity is lost is especially great, and there is a possibility that a texture being the object of the embodiment is impaired. From these viewpoints, the glass is preferably tempered by the latter chemical strengthening method. Incidentally, the glass and the chemically strengthened glass used in the embodiment can be used with an appropriate plate thickness. This plate thickness is preferably 0.4 mm to 3 mm, for instance.

The chemical strengthening can be performed by, for example, immersing the glass in molten salt at 400° C. to 550° C. for about one hour to twenty hours. The molten salt used for the chemical strengthening is not particularly limited, provided that it contains potassium ions or sodium ions, but molten salt of potassium nitrate ($KNO_3$) is suitably used, for instance. Besides, molten salt of sodium nitrate ($NaNO_3$) or molten salt of a mixture of potassium nitrate ($KNO_3$) and sodium nitrate ($NaNO_3$) may be used.

The glass or the chemically strengthened glass used in the embodiment may be what is called phase-separated glass or glass ceramics in which phase separation or a crystal is generated in the glass. By generating the phase separation or the crystal in the glass, it is possible to diffuse light transmitted by the glass owing to a fine structure of the phase separation or the crystal, to lower reflection transmittance of the glass.

The crystallized glass has crystal phases with a several nm to several μm size distributed in a glass matrix, and by changing the kind or size of the precipitated crystal by selecting a composition of base glass or by controlling a manufacturing condition and a heat treatment condition, it is possible to obtain glass having a desired blocking property.

In the phase-separated glass, two glass phases or more different in composition are distributed. There are spinodal in which two phases are continuously distributed and binodal in which one phase is distributed in a granular form in the matrix, and each phase has a 1 μm size or less. As the phase-separated glass, it is possible to obtain glass having a desired blocking property by a composition arrangement for appropriate phase-separated regions and a heat-treatment condition under which the phase separation processing is performed.

A method of manufacturing the glass or the chemically strengthened glass used in the embodiment is not particularly limited, but for example, appropriate amounts of various glass raw materials are blended, and after melted by heating, they are made uniform by defoaming, stirring, or the like, and the resultant mixture is formed into a plate shape or the like by a well-known down-draw method, a pressing method, or the like, or is formed into a desired shape by casting. Then, after slow cooling, it is cut into a desired size and is subjected to polishing as required. Alternatively, after glass once formed in a massive form is softened by re-heating, it is press-formed, whereby glass with a desired shape is obtained. Further, as for the chemically strengthened glass used in the embodiment, the glass obtained in this manner is chemically strengthened. Then, the glass having undergone the chemical strengthening is cooled, whereby the chemically strengthened glass is obtained.

The colored coating film applied and formed on one major surface of the glass is formed for the purpose of imparting a light blocking property and obtaining a desired color tone as the coating film-attached glass. Therefore, as a coating material used for forming the coating film, one appropriately selected according to the purpose such as the light blocking property and the color tone is usable, provided that it is a generally known one. Further, in a case where the glass is used as an exterior member, the colored coating film applied on the one major surface of the glass may be formed on an inner surface side (interior side of the device) or may be formed on an outer surface side (outer surface side of the device).

Further, chromaticity of the coating film refers to one measured on the coating film itself having a thickness when the coating film is in a state of being applied on a surface of a transparent substrate such as glass used as an exterior member or the like. The measurement on the coating film itself is performed, with the coating film formed on the transparent substrate being set on a rear surface side (side opposite a surface irradiate with light from a light source), and measurement light at this time is radiated to the coating film after passing through the transparent substrate. The transparent substrate in the embodiment refers to a transparent plate in a plate shape whose average transmittance for visible light (wavelength: 380 to 780 nm) is 90% or more. Therefore, a plate thickness and a material of the transparent substrate are not limited to particular ones, provided that it satisfies the aforesaid average transmittance.

The exterior member is not particularly limited, and can be suitably used in portable electronic devices that are expected to be used outdoors, for instance. The portable electronic devices are a concept including communication devices and information devices that are portably usable. For example, the communication devices include: a portable telephone, PHS (Personal Handy-phone System), a smartphone, PDA (Personal Data Assistance), PND (Portable Navigation Device, a portable car navigation system) as communication terminals; a portable radio, a portable television set, a one-seg receiver, and so on as broadcast receivers; and the like. Further, the information devices include a digital camera, a video camera, a portable music player, a sound recorder, a portable DVD player, a portable game machine, a notebook personal computer, a tablet PC, an electronic dictionary, an electronic notebook, an electronic book reader, a portable printer, a portable scanner, and the like. Further, the exterior member is usable also in a stationary electronic device and an electronic device mounted inside an automobile. Note that these examples are not restrictive.

Hitherto, the coating film-attached glass and the coating film-attached chemically strengthened glass of the embodiment have been described, taking examples, but their structures can be changed as required without departing from the spirit of the embodiment.

EXAMPLES

Hereinafter, a detailed description will be given based on examples of the present invention, but the present invention is not limited only to these examples.

Regarding each of examples 1 to 30 in Table 1 to Table 4, generally used glass raw materials such as an oxide, a hydroxide, carbonate, and nitrate were appropriately selected so that their compositions became as indicated in terms of molar percentage in the tables, and were weighed so that an amount as glass became 100 ml. Note that $SO_3$ written in the tables is residual $SO_3$ remaining in the glass after sodium sulfate ($Na_2SO_4$) was added to the glass raw materials and the sodium sulfate was decomposed, and its calculated values are given.

Next, these raw material mixtures were put into platinum crucibles, which were then put into a resistance-heating electric furnace at 1500 to 1600° C., and after the raw materials burned through by about 0.5 hour heating, they were melted for one hour, followed by defoaming. Thereafter, the mixtures were poured into molds with an about 50 mm length×an about 100 mm width×an about 20 mm height which were pre-heated to about 300° C., and slowly cooled at a rate of about 1° C./minute, whereby glass blocks were obtained. The glass blocks were cut, and glasses were cut out so that their size became 40 mm×40 mm and their thickness became 0.8 mm, and thereafter the glasses were ground, and finally their both surfaces were polished into mirror surfaces, whereby plate-shaped glasses were obtained.

Regarding each of the obtained plate-shaped glasses, a color tone was measured. As the color tone of each of the glasses, chromaticity of reflected light in the L*a*b* color system standardized by CIE was measured. As light sources, an F2 light source, a D65 light source, and an A light source were used, and the chromaticity of the reflected light was measured under each of these. The chromaticity measurement of the reflected light in the L*a*b* color system was conducted by using a spectro-colorimeter (Colori7 manufactured by X-rite Inc.). Incidentally, at the time of the measurement, a white resin plate was placed on a rear surface side of each of the glasses (rear surface of a surface irradiated with light from each of the light sources).

Results of the above evaluation are presented in Table 1 to Table 4.

TABLE 1

| mol % | Exam. 1 | Exam. 2 | Exam. 3 | Exam. 4 | Exam. 5 | Exam. 6 | Exam. 7 | Exam. 8 |
|---|---|---|---|---|---|---|---|---|
| $SiO_2$ | 71.7 | 70.9 | 71.4 | 70.9 | 71.2 | 70.9 | 71.6 | 71.4 |
| $Na_2O$ | 12.5 | 15.4 | 15.5 | 17.3 | 17.4 | 17.3 | 17.5 | 17.5 |
| $K_2O$ | 0.2 | 0.2 | 0.2 | 0.2 | 0.2 | 0.2 | 0.2 | 0.2 |
| MgO | 5.5 | 5.4 | 5.5 | 5.4 | 4.5 | 4.4 | 6.5 | 6.5 |
| CaO | 8.5 | 2.6 | 2.6 | 0.6 | 0.6 | 0.6 | 0 | 0 |
| $Al_2O_3$ | 1.1 | 4.1 | 4.1 | 4 | 5 | 5 | 3.1 | 3.1 |
| $Fe_2O_3$ | 0.12 | 0 | 0 | 0 | 0.49 | 0.93 | 0 | 0 |
| $Co_3O_4$ | 0.02 | 0.021 | 0.011 | 0 | 0.008 | 0.008 | 0.004 | 0.002 |
| NiO | 0.22 | 0.44 | 0.4 | 0.54 | 0.54 | 0.54 | 0.55 | 0.55 |
| CuO | 0 | 0.94 | 0.35 | 0.94 | 0 | 0 | 0.55 | 0.74 |
| $SO_3$ | 0.1 | 0.1 | 0.1 | 0.1 | 0.1 | 0.1 | 0.1 | 0.1 |
| Total | 100.0 | 100.1 | 100.2 | 100.0 | 100.0 | 100.0 | 100.1 | 100.1 |
| F2 light source L*value | 47.80 | 31.43 | 40.65 | 35.35 | 34.07 | 33.48 | 34.49 | 34.22 |
| a* value | -3.19 | -1.71 | -1.12 | -0.92 | 2.43 | 1.55 | 0.57 | -0.09 |
| b* value | -9.88 | -9.68 | -2.75 | 0.2 | -1.74 | 1.36 | -0.79 | -0.56 |
| D65 light source L*value | 48.25 | 31.8 | 40.54 | 35.05 | 33.78 | 33.12 | 34.18 | 33.92 |
| a* value | -1.70 | -1.1 | 0.02 | -0.53 | 5.2 | 3.56 | 2.11 | 0.94 |
| b* value | -8.74 | -8.74 | -2.53 | -0.3 | -2 | 0.91 | -1.39 | -1.14 |
| A light source L*value | 47.46 | 30.98 | 40.40 | 34.96 | 34.32 | 33.67 | 34.35 | 33.95 |
| a* value | -4.46 | -5.08 | -2.07 | -2.77 | 3.73 | 3.01 | 0.00 | -1.33 |
| b* value | -9.12 | -8.61 | -1.28 | 1.14 | 0.74 | 3.04 | 0.71 | 0.65 |
| Δa*(D65 − F2) | 1.49 | 0.61 | 1.14 | 0.39 | 2.77 | 2.01 | 1.54 | 1.03 |
| Δa*(A − F2) | -1.27 | -3.37 | -0.95 | -1.85 | 1.30 | 1.46 | -0.57 | -1.24 |

TABLE 2

| mol % | Exam. 9 | Exam. 10 | Exam. 11 | Exam. 12 | Exam. 13 | Exam. 14 | Exam. 15 | Exam. 16 |
|---|---|---|---|---|---|---|---|---|
| $SiO_2$ | 71.4 | 69.4 | 71.4 | 71.3 | 69.4 | 63.1 | 63.1 | 64.2 |
| $Na_2O$ | 17.5 | 17.5 | 17.5 | 17.4 | 16.5 | 12.3 | 12.3 | 12.5 |
| $K_2O$ | 0.2 | 0.2 | 0.2 | 0.2 | 0.2 | 4 | 3.9 | 4.0 |
| MgO | 9.4 | 8.4 | 6.5 | 6.4 | 8.4 | 10.3 | 10.3 | 10.5 |
| CaO | 0 | 0 | 0 | 0 | 0 | 0 | 0 | 0 |
| $Al_2O_3$ | 0.1 | 3.1 | 3.1 | 3.1 | 4.1 | 7.8 | 7.9 | 8.0 |
| $Fe_2O_3$ | 0 | 0 | 0.2 | 0.2 | 0 | 0 | 0 | 0 |
| $Co_3O_4$ | 0.002 | 0.002 | 0.004 | 0.004 | 0.007 | 0 | 0 | 0 |
| NiO | 0.55 | 0.55 | 0.55 | 0.54 | 0.55 | 0 | 0 | 0 |
| CuO | 0.74 | 0.74 | 0.5 | 0.74 | 0.74 | 0 | 0 | 0 |
| $ZrO_2$ | 0 | 0 | 0 | 0 | 0 | 0.5 | 0.5 | 0.5 |
| $MnO_2$ | 0 | 0 | 0 | 0 | 0 | 2.0 | 0 | 0 |
| $Cr_2O_3$ | 0 | 0 | 0 | 0 | 0 | 0 | 0 | 0.2 |
| $V_2O_5$ | 0 | 0 | 0 | 0 | 0 | 0 | 2.0 | 0 |
| $SO_3$ | 0.1 | 0.1 | 0.1 | 0.1 | 0.1 | 0.1 | 0.1 | 0.1 |
| Total | 100.0 | 100.0 | 100.1 | 100.0 | 100.0 | 100.0 | 100.3 | 100.3 |
| F2 light source L*value | 36.16 | 35.11 | 34.77 | 33.76 | 33.51 | 51.87 | 70.34 | 73.01 |
| a* value | -1.43 | -0.42 | 0.86 | -0.03 | -0.68 | 15.24 | 5.14 | -13.47 |
| b* value | 5.57 | 2.18 | 1.16 | 0.54 | 0.2 | 2.75 | 49.68 | 65.71 |
| D65 light source L*value | 35.68 | 34.68 | 34.36 | 33.43 | 33.21 | 50.59 | 67.73 | 70.93 |
| a* value | -1.12 | 0.31 | 2.5 | 1.09 | 0.14 | 22.13 | 8.89 | -16.91 |
| b* value | 4.29 | 1.33 | 0.45 | -0.05 | -0.34 | 2.51 | 43.86 | 59.08 |
| A light source L*value | 35.85 | 34.82 | 34.72 | 33.58 | 33.22 | 53.42 | 70.95 | 71.87 |
| a* value | -1.88 | -1.31 | 1.12 | -0.52 | -1.69 | 20.74 | 13.54 | -10.44 |
| b* value | 5.69 | 3.03 | 2.63 | 1.64 | 1.10 | 9.37 | 46.92 | 55.28 |
| Δa*(D65 − F2) | 0.31 | 0.73 | 1.64 | 1.12 | 0.82 | 6.89 | 3.75 | -3.44 |
| Δa*(A − F2) | -0.45 | -0.89 | 0.26 | -0.49 | -1.01 | 5.50 | 8.40 | 3.03 |

TABLE 3

| mol % | | Exam. 17 | Exam. 18 | Exam. 19 | Exam. 20 | Exam. 21 | Exam. 22 | Exam. 23 | Exam. 24 | Exam. 25 |
|---|---|---|---|---|---|---|---|---|---|---|
| | $SiO_2$ | 64.2 | 64.2 | 63.1 | 63.1 | 63.0 | 62.9 | 70.4 | 62.0 | 71.2 |
| | $B_2O_3$ | 0 | 0 | 0 | 0 | 0 | 6.8 | 0 | 0 | 0 |
| | $Al_2O_3$ | 8.0 | 8.0 | 7.8 | 7.9 | 7.8 | 13.6 | 1.1 | 7.7 | 3.1 |
| | $Na_2O$ | 12.5 | 12.5 | 12.3 | 12.3 | 12.4 | 13.8 | 12.3 | 12.1 | 16.6 |
| | $K_2O$ | 4.0 | 4.0 | 3.9 | 3.9 | 3.9 | 0.5 | 0.2 | 3.9 | 0.2 |
| | CaO | 0 | 0 | 0 | 0 | 0 | 0.1 | 8.4 | 0 | 0 |
| | MgO | 10.5 | 10.5 | 10.3 | 10.3 | 10.1 | 0.02 | 5.4 | 10.1 | 8.5 |
| | $ZrO_2$ | 0.5 | 0.5 | 0.5 | 0.4 | 0.5 | 0 | 0 | 0.5 | 0.0 |
| | NiO | 0 | 0.3 | 0 | 0.7 | 0 | 0 | 0 | 0 | 0.1 |
| | $Co_3O_4$ | 0.2 | 0 | 0 | 0.05 | 0.1 | 0.1 | 0.1 | 0.4 | 0.02 |
| | CuO | 0 | 0 | 2.0 | 1.0 | 0 | 0 | 0 | 0 | 0.1 |
| | $Fe_2O_3$ | 0 | 0 | 0 | 0 | 1.8 | 1.8 | 2.0 | 3.3 | 0 |
| | $TiO_2$ | 0 | 0 | 0 | 0.3 | 0 | 0 | 0 | 0 | 0 |
| | $SeO_2$ | 0 | 0 | 0 | 0 | 0.004 | 0.004 | 0.004 | 0 | 0 |
| | Cl | 0 | 0 | 0 | 0 | 0 | 0.2 | 0 | 0 | 0 |
| | $SO_3$ | 0.1 | 0.1 | 0.1 | 0.1 | 0.1 | 0 | 0.1 | 0.1 | 0.1 |
| | Total | 99.8 | 100.0 | 100.0 | 100.0 | 99.7 | 99.8 | 100.0 | 100.0 | 100.0 |
| F2 light source | L* value | 25.73 | 63.69 | 66.02 | 25.72 | 26.51 | 24.88 | 25.7 | 25.54 | 69.72 |
| | a* value | 20.36 | 5.4 | −19.73 | −0.68 | −0.88 | 0.07 | 0.5 | 0.08 | 0.14 |
| | b* value | −47.9 | 23.86 | −12.19 | −1.97 | −3.92 | −1.1 | −5.86 | −0.68 | 0.75 |
| D65 light source | L* value | 26.47 | 62.13 | 68.29 | 26.01 | 26.6 | 24.93 | 25.87 | 25.57 | 69.4 |
| | a* value | 27.11 | 8.14 | −27.59 | −0.1 | −0.34 | 0.06 | 1.16 | 0.09 | 0.56 |
| | b* value | −41.8 | 21.29 | −8.9 | −2.03 | −3.59 | −0.94 | −5.29 | −0.57 | 1.38 |
| A light source | L* value | 25.07 | 64.36 | 64.5 | 25.87 | 26.32 | 24.86 | 25.62 | 254.5 | 69.59 |
| | a* value | 7.14 | 10.86 | −31.49 | −1.1 | −1.56 | −0.2 | −0.33 | −0.06 | −0.23 |
| | b* value | −40.02 | 25.22 | −16.77 | −1.69 | −3.88 | −0.97 | −5.36 | −0.56 | 2.44 |
| Δa*(D65 − F2) | | 6.75 | 2.74 | −7.86 | 0.58 | 0.54 | −0.01 | 0.66 | 0.01 | 0.42 |
| Δa*(A − F2) | | −13.22 | 5.46 | −11.76 | −0.42 | −0.68 | −0.27 | −0.83 | −0.14 | −0.37 |

TABLE 4

| mol % | | Exam. 26 | Exam. 27 | Exam. 28 | Exam. 29 | Exam. 30 |
|---|---|---|---|---|---|---|
| | $SiO_2$ | 63.7 | 69.3 | 63.5 | 70.5 | 67.3 |
| | $Al_2O_3$ | 7.9 | 4.0 | 7.8 | 4.1 | 3.8 |
| | $Na_2O$ | 12.4 | 15.2 | 12.3 | 15.5 | 9.0 |
| | $K_2O$ | 4.0 | 0.2 | 3.9 | 0.2 | 0.2 |
| | CaO | 0 | 0 | 0 | 0 | 8.04 |
| | MgO | 8.9 | 8.3 | 10.3 | 8.4 | 5.1 |
| | $ZrO_2$ | 0.5 | 0 | 0.4 | 0 | 0 |
| | ZnO | 0 | 0 | 0.0 | 0 | 5.6 |
| | NiO | 0 | 0 | 0.44 | 0 | 0.37 |
| | $Co_3O_4$ | 0 | 0 | 0.02 | 0 | 0.07 |
| | CuO | 0 | 0 | 0.93 | 0.99 | 0.42 |
| | $TiO_2$ | 0 | 0 | 0.25 | 0 | 0 |
| | $Cr_2O_3$ | 0 | 0 | 0 | 0.25 | 0 |
| | $MnO_2$ | 0 | 2.0 | 0 | 0 | 0 |
| | $Er_2O_3$ | 0 | 1.0 | 0 | 0 | 0 |
| | $MoO_3$ | 0.05 | 0 | 0 | 0 | 0 |
| | $Nd_2O_3$ | 0.64 | 0 | 0 | 0 | 0 |
| | C | 0.99 | 0 | 0 | 0 | 0 |
| | $SO_3$ | 1.0 | 0.1 | 0.1 | 0.1 | 0 |
| | Total | 100.0 | 100.0 | 100.0 | 100.0 | 100.0 |
| F2 light source | L* value | 33.18 | 52.01 | 34.42 | 56.77 | 30.23 |
| | a* value | 18.45 | 17.25 | −5.23 | −32.31 | −1.72 |
| | b* value | 14.66 | 2.06 | −1.78 | 11.29 | −10.86 |
| D65 light source | L* value | 32.91 | 50.25 | 34.69 | 58.5 | 30.68 |
| | a* value | 25.96 | 25.34 | −6 | −41.7 | −0.23 |
| | b* value | 14.21 | 1.28 | −1.69 | 13.66 | −10.01 |
| A light source | L* value | 36.87 | 53.38 | 33.9 | 55.05 | 29.87 |
| | a* value | 28.72 | 22.51 | −7.39 | −42.99 | −3.9 |
| | b* value | 21.05 | 9.06 | −2.53 | 6.09 | −10.23 |
| Δa*(D65 − F2) | | 7.51 | 8.09 | −0.77 | −9.39 | 1.49 |
| Δa*(A − F2) | | 10.27 | 5.26 | −2.16 | −10.68 | −2.18 |

Next, it was confirmed whether or not metamerism ascribable to a coating film was corrected by the glasses of the examples.

First, acrylic paints (Tamiya Color, X-1 (black, hereinafter referred to as a paint (1)) and XF-56 (metallic gray, hereinafter referred to as a paint (2))) which were commercially available were applied on respective transparent styrol resin plates each with a 0.35 mm plate thickness (average transmittance for visible light was 90% or more) with a flat brush to form a coating film (1) and a coating film (2), which were used as samples for examining a color tone of only the coating film. Next, after the paints were dried, color tones (chromaticities of reflected lights of the L*a*b* color system standardized by CIE) of the respective coating films were measured. The color tones of the coating films were measured by the same method as that for the color tone of the glass, with each of the coating films being set on a rear surface side (side opposite a surface irradiated with light from the light source) of the transparent styrol resin plate. Next, the aforesaid paints were applied with a flat brush on one major surface of each of the glasses of the above-described examples (the example 14 to the example 19, the example 22 and the example 24, being comparative examples with respect to the coating film (1)), whereby coating film-attached glasses (an example 2-1 to an example 2-7 as the examples, and an example 2-8 as a comparative example) each having the coating film (1) and coating film-attached glasses (an example 3-1 to an example 3-7 as the examples) each having the coating film (2) were obtained. Next, after the paints were dried, a color tone (chromaticity of reflected light of the L*a*b* color system standardized by CIE) of each of the coating film-attached glasses was measured. Incidentally, when the chromaticity of each of the coating film-attached glasses was measured, the coating film was located on the rear surface of the surface on which measurement light was incident.

The color tones of the coating films and the glasses provided with the coating films are presented in Table 5 and Table 6.

TABLE 5

| | | Only coating film (1) | Coating film-attached glass having coating film (1) | | | | | | | |
|---|---|---|---|---|---|---|---|---|---|---|
| | | | Exam. 2-1 | Exam. 2-2 | Exam. 2-3 | Exam. 2-4 | Exam. 2-5 | Exam. 2-6 | Exam. 2-7 | Exam. 2-8 |
| Glass used | | — | Exam. 14 | Exam. 15 | Exam. 16 | Exam. 17 | Exam. 18 | Exam. 19 | Exam. 22 | Exam. 24 |
| F2 | L*value | 24.17 | 29.07 | 34.12 | 34.02 | 24.36 | 31.51 | 32.27 | 25.36 | 25.47 |
| | a* value | 0.15 | 3.42 | 1.17 | −3.86 | 2.46 | 1.41 | −4.97 | 0.15 | 0.00 |
| | b* value | −0.29 | 0.31 | 10.76 | 14.02 | −8.67 | 5.13 | −3.87 | −1.19 | −0.75 |
| D65 | L*value | 24.18 | 28.79 | 33.44 | 33.45 | 24.47 | 31.11 | 32.88 | 25.40 | 25.51 |
| | a* value | 0.19 | 4.98 | 2.04 | −4.77 | 3.55 | 2.15 | −7.00 | 0.15 | 0.02 |
| | b* value | −0.24 | 0.15 | 9.36 | 12.61 | −7.49 | 4.40 | −3.03 | −1.04 | −0.65 |
| A | L*value | 24.18 | 29.38 | 34.26 | 33.69 | 24.29 | 31.66 | 31.85 | 25.35 | 25.46 |
| | a* value | 0.13 | 4.69 | 3.45 | −3.03 | 0.72 | 2.74 | −7.81 | −0.12 | −0.15 |
| | b* value | −0.19 | 1.71 | 10.37 | 12.20 | −6.76 | 5.54 | −5.07 | −1.05 | −0.67 |
| Δa*(D65 − F2) | | 0.04 | 1.56 | 0.87 | −0.91 | 1.09 | 0.74 | −2.03 | 0.00 | 0.02 |
| Δa*(A − F2) | | −0.02 | 1.27 | 2.28 | 0.83 | −1.74 | 1.33 | −2.84 | −0.27 | −0.15 |
| Glass & coating film (1) - only coating film (1) | Δa*(D65 − F2) | — | 1.52 | 0.83 | −0.95 | 1.05 | 0.70 | −2.07 | −0.04 | −0.02 |
| | Δa*(A − F2) | — | 1.29 | 2.30 | 0.85 | −1.72 | 1.35 | −2.82 | −0.25 | −0.13 |
| Only glass | Δa*(D65 − F2) | — | 6.86 | 3.75 | −3.44 | 6.75 | 2.74 | −7.86 | −0.01 | 0.01 |
| | Δa*(A − F2) | — | 5.50 | 8.40 | 3.03 | −13.22 | 5.46 | −11.76 | −0.27 | −0.14 |
| Absolute value of difference between glass and coating film (1) | Δa*(D65 − F2) | — | 6.82 | 3.71 | 3.48 | 6.71 | 2.70 | 7.90 | 0.05 | 0.03 |
| | Δa*(A − F2) | — | 5.52 | 8.42 | 3.05 | 13.20 | 5.48 | 11.74 | 0.25 | 0.12 |

TABLE 6

| | | Only coating film (2) | Coating film-attached glass having coating film (2) | | | | | | |
|---|---|---|---|---|---|---|---|---|---|
| | | | Exam. 3-1 | Exam. 3-2 | Exam. 3-3 | Exam. 3-4 | Exam. 3-5 | Exam. 3-6 | Exam. 3-7 |
| Glass used | | — | Exam. 14 | Exam. 15 | Exam. 16 | Exam. 17 | Exam. 18 | Exam. 19 | Exam. 22 |
| F2 | L*value | 52.67 | 35.34 | 44.74 | 45.75 | 24.68 | 40.76 | 41.82 | 25.38 |
| | a* value | −0.43 | 7.09 | 2.35 | −7.28 | 5.68 | 2.67 | −10.24 | 0.15 |
| | b* value | 3.37 | 2.46 | 23.39 | 30.92 | −17.59 | 12.60 | −4.95 | −1.21 |
| D65 | L*value | 52.53 | 34.68 | 43.38 | 44.60 | 24.88 | 39.89 | 42.90 | 25.42 |
| | a* value | −0.51 | 10.42 | 4.15 | −9.00 | 8.11 | 4.20 | −14.24 | 0.16 |
| | b* value | 3.03 | 1.92 | 20.50 | 27.89 | −15.35 | 10.91 | −3.57 | −1.04 |
| A | L*value | 52.68 | 36.06 | 45.02 | 45.02 | 24.51 | 41.07 | 41.02 | 25.36 |
| | a* value | 0.08 | 10.00 | 6.72 | −5.64 | 1.83 | 5.55 | −15.70 | −0.11 |
| | b* value | 3.16 | 5.30 | 22.36 | 26.76 | −13.99 | 13.19 | −7.41 | −1.05 |
| Δa*(D65 − F2) | | −0.08 | 3.33 | 1.80 | −1.72 | 2.43 | 1.53 | −4.00 | 0.01 |
| Δa*(A − F2) | | 0.51 | 2.91 | 4.37 | 1.64 | −3.85 | 2.88 | −5.46 | −0.26 |
| Glass & coating film (2) - only coating film (2) | Δa*(D65 − F2) | — | 3.41 | 1.88 | −1.64 | 2.51 | 1.61 | −3.92 | 0.09 |
| | Δa*(A − F2) | — | 2.40 | 3.86 | 1.13 | −4.36 | 2.37 | −5.97 | −0.77 |
| Only glass | Δa*(D65 − F2) | — | 6.86 | 3.75 | −3.44 | 6.75 | 2.74 | −7.86 | −0.01 |
| | Δa*(A − F2) | — | 5.50 | 8.40 | 3.03 | −13.22 | 5.46 | −11.76 | −0.27 |
| Absolute value of difference between glass and coating film (2) | Δa*(D65 − F2) | — | 6.94 | 3.83 | 3.36 | 6.83 | 2.82 | 7.78 | 0.07 |
| | Δa*(A − F2) | — | 4.99 | 7.89 | 2.52 | 13.73 | 4.95 | 12.27 | 0.78 |

As is seen in Table 5 and Table 6, it has been confirmed that (Δa*(D65−F2)) and (Δa*(A−F2)) vary between "only the coating film" and "each coating film-attached glass" when the coating film is formed on the glass of each of the above-described examples. Further, a tendency of this variation ("glass & coating film (1)—only coating film (1)" in Table 5, "glass & coating film (2)—only coating film (2)" in Table 6) matches a tendency of metamerism of "only glass" used, and the result shows that the glasses have an effect of correcting the metamerism of the coating film. Note that "glass & coating film (1)—only coating film (1)" in Table 5 is a value obtained by subtracting Δa* corresponding to only the coating film (1) from Δa* corresponding to the coating film attached-glass having the coating film (1) formed on one surface of the used glass.

In the glass of the example 24, "absolute value of difference between glass and coating film (1)" in Δa* is less than 0.2 in both cases. Therefore, the glass of the example 24 corresponds to the comparative example of the embodiment in a case where the coating film (1) is formed on its one surface. As is shown in Table 5, when the coating film (1) is formed on the glass of the example 24, (Δa*(D65−F2)) and (Δa*(A−F2)) change little between "only coating film" and "each coating film-attached glass", and the effect of correcting the metamerism cannot be recognized in the coating film-attached glass of the comparative example.

The present invention is usable as operation panels of AV devices•OA devices etc., opening/closing doors and operation buttons•knobs of the same products, or decorative articles such as decorative panels disposed around rectangular display surfaces of image display panels of a digital photo frame, TV, and the like, and as exterior members for electronic devices, and so on. Further, it is also usable as interior members for automobiles, members of furniture or the like, building materials used outdoors or indoors, and so on.

What is claimed is:

1. A coating film-attached glass comprising, glass containing a coloring component; and a colored coating film formed on one major surface of the glass, wherein at least one of an absolute value of a difference between ($\Delta a^*$(D65-F2)) of the glass and ($\Delta a^*$(D65-F2)) of the coating film and an absolute value of a difference between ($\Delta a^*$(A-F2)) of the glass and ($\Delta a^*$(A-F2)) of the coating film is 0.2 or more, where ($\Delta a^*$(D65-F2)) is a difference between a chromaticity $a^*$ value of reflected light by a D65 light source and a chromaticity $a^*$ value of reflected light by an F2 light source in an $L^*a^*b^*$ color system, which difference is expressed by the following expression (1), $$\Delta a^*(D65-F2) = a^*\text{value}(D65\text{ light source}) - a^*\text{value}(F2\text{ light source}) \quad (1),\text{ and}$$

($\Delta a^*$(A-F2)) is a difference between a chromaticity $a^*$ value of reflected light by an A light source and the chromaticity $a^*$ value of the reflected light by the F2 light source in the $L^*a^*b^*$ color system, which difference is expressed by the following expression (2), $$\Delta a^*(A-F2) = a^*\text{value}(A\text{ light source}) - a^*\text{value}(F2\text{ light source}) \quad (2),$$

values calculated by the expression (1) and the expression (2) are values of chromaticities of the major surface which are measured on the glass in a state of a glass plate with a 0.8 mm thickness, and values of chromaticities which are measured on the coating film in a state of being formed on a transparent substrate.

2. The coating film-attached glass according to claim 1, wherein an $L^*$ value (F2 light source) of the glass in the $L^*a^*b^*$ color system is within a range of 20 to 90.

3. The coating film-attached glass according to claim 1, wherein the glass contains, in terms of molar percentage on a basis of the following oxides, 55 to 80% of $SiO_2$, 0.25 to 16% of $Al_2O_3$, 0 to 12% of $B_2O_3$, 5 to 20% of $Na_2O$, 0 to 15% of $K_2O$, 0 to 15% of MgO, 0 to 15% of CaO, 0 to 25% of $\Sigma$RO (R is Mg, Ca, Sr, Ba, Zn), and 0.001 to 10% of $M_pO_q$ (M is at least one kind selected from Fe, Cu, V, Se, Co, Ti, Cr, Pr, Ce, Bi, Eu, Mn, Er, Ni, Nd, W, Rb, and Ag, and p and q are atomic ratios of M and O).

4. The coating film-attached glass according to claim 1, being used as an exterior member.

5. An exterior member comprising the coating film-attached glass according to claim 1.

6. An electronic device comprising the exterior member according to claim 5 provided on an exterior of the electronic device.

7. Coating film-attached chemically strengthened glass being coating film-attached glass comprising: glass containing a coloring component; and a colored coating film formed on one major surface of the glass, wherein:

at least one of an absolute value of a difference between ($\Delta a^*$(D65-F2)) of the glass and ($\Delta a^*$(D65-F2)) of the coating film and an absolute value of a difference between ($\Delta a^*$(A-F2)) of the glass and ($\Delta a^*$(A-F2)) of the coating film is 0.2 or more;

where ($\Delta a^*$(D65-F2)) is a difference between a chromaticity $a^*$ value of reflected light by a D65 light source and a chromaticity $a^*$ value of reflected light by an F2 light source in an $L^*a^*b^*$ color system, which difference is expressed by the following expression (1), $$\Delta a^*(D65-F2) = a^*\text{value}(D65\text{ light source}) - a^*\text{value}(F2\text{ light source}) \quad (1),\text{ and}$$

($\Delta a^*$(A-F2)) is a difference between a chromaticity $a^*$ value of reflected light by an A light source and the chromaticity $a^*$ value of the reflected light by the F2 light source in the $L^*a^*b^*$ color system, which difference is expressed by the following expression (2), $$\Delta a^*(A-F2) = a^*\text{value}(A\text{ light source}) - a^*\text{value}(F2\text{ light source}) \quad (2),$$

values calculated by the expression (1) and the expression (2) are values of chromaticities of the major surface which are measured on the glass in a state of a glass plate with a 0.8 mm thickness, and values of chromaticities which are measured on the coating film in a state of being formed on a transparent substrate; and the glass is chemically strengthened glass having a surface compressive stress layer with 5 to 70 μm from a surface of the glass in a depth direction.

8. The coating film-attached chemically strengthened glass according to claim 7, wherein an $L^*$ value (F2 light source) of the glass in the $L^*a^*b^*$ color system is within a range of 20 to 90.

9. The coating film-attached chemically strengthened glass according to claim 7, wherein the glass contains, in terms of molar percentage on a basis of the following oxides, 55 to 80% of $SiO_2$, 0.25 to 16% of $Al_2O_3$, 0 to 12% of $B_2O_3$, 5 to 20% of $Na_2O$, 0 to 15% of $K_2O$, 0 to 15% of MgO, 0 to 15% of CaO, 0 to 25% of $\Sigma$RO (R is Mg, Ca, Sr, Ba, Zn), and 0.001 to 10% of $M_pO_q$ (M is at least one kind selected from Fe, Cu, V, Se, Co, Ti, Cr, Pr, Ce, Bi, Eu, Mn, Er, Ni, Nd, W, Rb, and Ag, and p and q are atomic ratios of M and O).

10. The coating film-attached chemically strengthened glass according to claim 7, wherein the glass has a 300 to 1400 MPa surface compressive stress.

11. The coating film-attached chemically strengthened glass according to claim 7, being used as an exterior member.

12. An exterior member comprising the coating film-attached chemically strengthened glass according to claim 7.

13. An electronic device comprising the exterior member according to claim 12 provided on an exterior of the electronic device.

* * * * *